United States Patent
Wu et al.

(10) Patent No.: US 8,081,544 B2
(45) Date of Patent: Dec. 20, 2011

(54) METHOD AND APPARATUS FOR DECIDING SPHERICAL ABERRATION COMPENSATION VALUE

(75) Inventors: Gwo-Huei Wu, Pan-Chiao (TW);
Hsiang-Ji Hsieh, Jhubei (TW);
Chih-Yuan Chen, Hsin-Chu (TW);
Chao-Ming Huang, Hsin-Tien (TW)

(73) Assignee: Mediatek, Inc., Hsinchu (TW)

( * ) Notice: Subject to any disclaimer, the term of this patent is extended or adjusted under 35 U.S.C. 154(b) by 342 days.

(21) Appl. No.: 12/352,927

(22) Filed: Jan. 13, 2009

(65) Prior Publication Data
US 2009/0180362 A1    Jul. 16, 2009

(30) Foreign Application Priority Data

Jan. 15, 2008 (TW) .............................. 97101496 A

(51) Int. Cl.
*G11B 7/00* (2006.01)
(52) U.S. Cl. ................... 369/44.32; 369/53.23
(58) Field of Classification Search ........................ None
See application file for complete search history.

(56) References Cited

U.S. PATENT DOCUMENTS

| | | | |
|---|---|---|---|
| 6,721,259 B1 | 4/2004 | Yamamoto et al. | |
| 6,756,574 B2 | 6/2004 | Higuchi | |
| 7,031,233 B2 * | 4/2006 | Ichimura | 369/44.11 |
| 2002/0027842 A1 | 3/2002 | Komma et al. | |
| 2003/0202437 A1 | 10/2003 | Yamada et al. | |
| 2004/0017743 A1 * | 1/2004 | Sasaki et al. | 369/44.32 |
| 2005/0094506 A1 | 5/2005 | Shihara et al. | |
| 2006/0221782 A1 | 10/2006 | Kanenaga | |
| 2007/0070850 A1 * | 3/2007 | Watanabe et al. | 369/53.22 |
| 2007/0097809 A1 * | 5/2007 | Miyaoka | 369/44.23 |
| 2008/0205248 A1 | 8/2008 | Janssen et al. | |
| 2009/0168616 A1 * | 7/2009 | Chung et al. | 369/44.32 |

FOREIGN PATENT DOCUMENTS

| | | |
|---|---|---|
| TW | 200703301 | 1/2007 |
| TW | 200715278 | 4/2007 |
| WO | 2005043528 | 5/2005 |

OTHER PUBLICATIONS

Office Action from corresponding Taiwanese Application No. 097101496 dated May 18, 2011.

* cited by examiner

*Primary Examiner* — Lixi C Simpson
(74) *Attorney, Agent, or Firm* — Grossman, Tucker, Perreault & Pfleger, PLLC

(57) ABSTRACT

A method and an apparatus for deciding a spherical aberration compensation (SAC) value for an optical storage medium are provided. The optical storage medium comprises at least one recording layer and a cover layer. The SAC value is suitable for a selected one of the at least one recording layer. First, a focus search on the optical storage medium is performed to derive a focus error (FE) signal in response to a testing SAC value. Then, a center level and a center basis corresponding to the testing SAC value according to the FE signal is determined. The SAC value according to the center level, the center basis, and the testing SAC value is also determined. When the center level and the center basis are equal, the SAC value is determined to be the testing SAC value.

14 Claims, 7 Drawing Sheets

METHOD AND APPARATUS FOR DECIDING SPHERICAL ABERRATION COMPENSATION VALUE

This application claims the benefit from the priority of Taiwan Patent Application No. 097101496 filed on Jan. 15, 2008, the disclosure of which is incorporated by reference herein in its entirety.

CROSS-REFERENCES TO RELATED APPLICATIONS

Not applicable.

BACKGROUND OF THE INVENTION

1. Field of the Invention

The present invention relates to an optical control method and an optical control apparatus; and more particularly, the present invention relates to a method and an apparatus for deciding a spherical aberration compensation (SAC) value for an optical storage medium.

2. Descriptions of the Related Art

Optical storage media such as compact discs are often used by consumers for reading and writing massive data. A number of optical storage apparatuses and methods have employed blu-rays, which have a shorter wavelength than the red-rays, to read and write data from and to the optical storage media. However, compared to the red-ray, the light spot on the optical storage medium generated by a blu-ray has a more severe spherical aberration (SA). Therefore, calibration of spherical aberration when using blu-rays is still in highly demand.

SUMMARY OF THE INVENTION

One objective of this invention is to provide a method for deciding a spherical aberration compensation (SAC) value for an optical storage medium. The optical storage medium comprises at least one recoding layer and a cover layer. The SAC value is suitable for a selected recording layer among the at least one recording layer.

The method for deciding the SAC value for an optical storage medium comprises the following steps: (a) performing a focus search on the optical storage medium to derive a focus error (FE) signal in response to at least one testing SAC value, wherein the FE signal comprises a plurality of s-curves, and each of the s-curves corresponds to one of the at least one recording layer and the cover layer respectively; (b) calculating a center basis corresponding to the testing SAC value according to the FE signal; (c) calculating a center level corresponding to the testing SAC value according to the s-curve corresponding to the selected recording layer; and (d) deciding the SAC value according to the center level, the center basis, and the testing SAC value.

Another objective of this invention is to provide an apparatus for deciding an SAC value for an optical storage medium. The optical storage medium comprises at least one recoding layer and a cover layer. The SAC value is suitable for a selected recording layer among the at least one recording layer. The apparatus comprises a focus error (FE) signal generator, a focus level generator, and an SAC value generator. The FE signal generator is configured to perform a focus search on the optical storage medium to derive an FE signal in response to at least one testing SAC value. The FE signal comprises a plurality of s-curves, each of which corresponds to one of the at least one recording layer and the cover layer respectively. The focus level generator is configured to calculate a center basis corresponding to the testing SAC value according to the FE signal, and to calculate a center level corresponding to the testing SAC value according to the s-curve corresponding to the selected recording layer. The SAC value generator is configured to decide the SAC value according to the center level, the center basis, and the testing SAC value.

In summary, the apparatus and method of this invention derives the SAC value suitable for the selected recording layer simply according to at least one testing SAC value and the s-curve corresponding to the selected recording layer. Thus, the present invention remarkably simplifies the conventional methods used for deciding the SAC value for the optical storage medium.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

An apparatus and a simplified method for deciding a spherical aberration compensation (SAC) value suitable for a selected recording layer of an optical storage medium are proposed in this invention. This invention derives the suitable SAC value according to a focus error (FE) signal corresponding to a testing SAC value.

Figure 1:
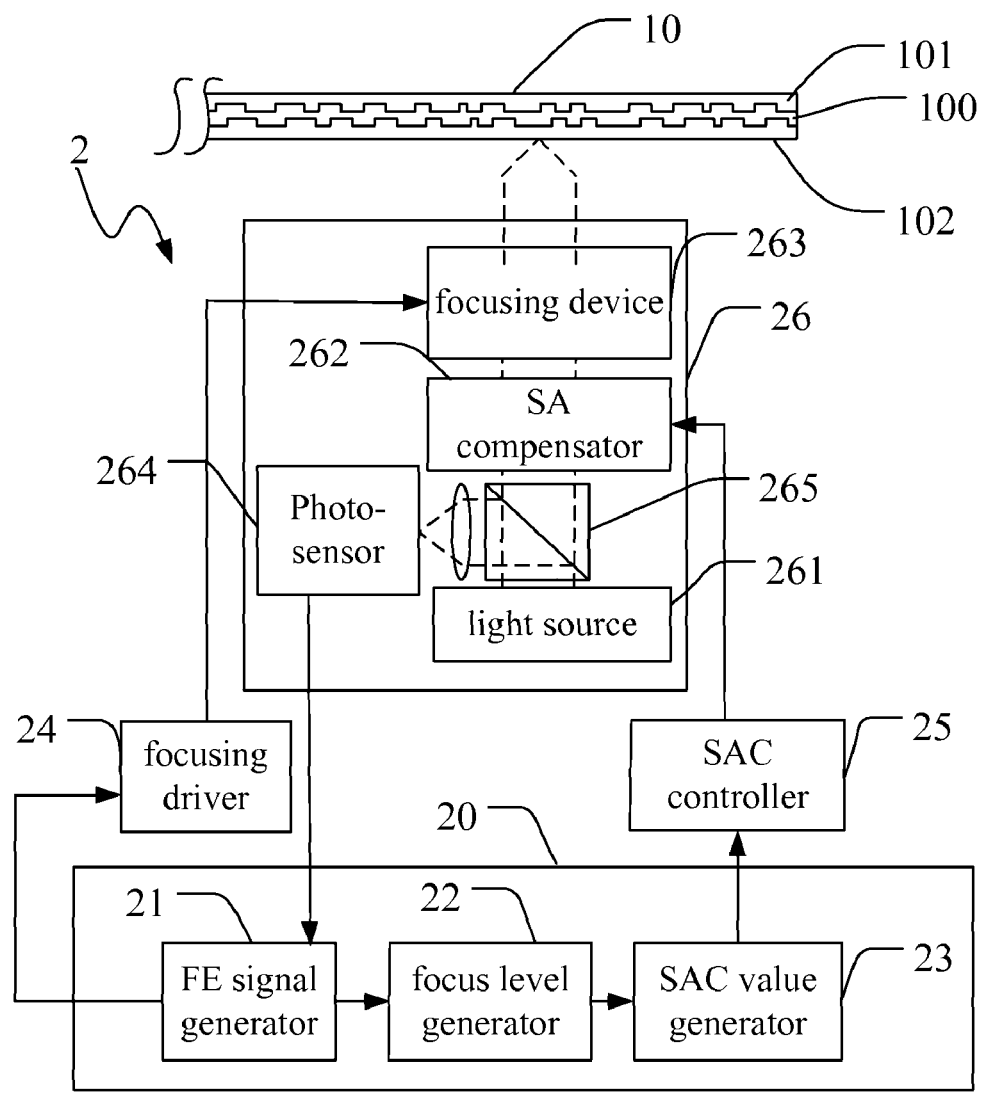
FIG. 1 is a schematic view of a spherical aberration compensation apparatus of this invention.

A first embodiment of this invention utilizes an optical access apparatus to access an optical storage medium. Referring to FIG. 1, an optical storage medium 10 and an optical access apparatus 2 utilizing this invention are depicted therein. The optical storage medium 10 comprises a plurality of recording layers 100, 101 and a cover layer 102. Additionally, this invention is also applicable to an optical storage medium with only one single recording layer. The optical access apparatus 2 intends to access a selected recording layer among the recording layers 100, 101, which is the recording layer 101 herein. Prior to accessing, the optical access apparatus 2 firstly utilizes an apparatus 20 of this invention to decide an SAC value suitable for the selected recording layer 101 of the optical storage medium 10. In this embodiment, the optical storage medium 10 may be a compact disc (CD) type disc, DVD type disc, or even a blu-ray type optical disc, and the recording layers 100, 101 include two recording layers. It should be emphasized that the specifications of the optical storage medium and the number of recording layers set forth herein are not intended to limit the scope of this invention.

The optical access apparatus 2 comprises the apparatus 20 of this invention, a focusing driver 24, an SAC controller 25, and an optical system 26. The apparatus 20 of this invention comprises an FE signal generator 21, a focus level generator 22, and an SAC value generator 23. The optical system 26 comprises a light source 261, a spherical aberration (SA) compensator 262, a focusing device 263, a photo sensor 264, and a beam splitter 265.

The light source 261 is configured to emit a light beam, which passes through the beam splitter 265, the SA compensator 262, and the focusing device 263 before being focused onto the optical storage medium 10. Assuming that an SAC value suitable for the selected recording layer 101 is known, the SA compensator 262 is able to cancel the spherical aberration by moving an optical lens (not shown) within. The SA compensator 262 may move the optical lenses by use of, for example but not limited to, a linear motor (not shown). The focusing device 263 then uses the optical lens (not shown) within to focus the light beam from the light source 261 onto the optical storage medium so as to access the selected recording layer 101. The focusing device 263 may move the optical lens by use of, for example but not limited to, a linear motor (not shown). In case the SAC value suitable for the selected recording layer 101 is unknown, the photo sensor 264 may sense a light beam reflected from the optical storage medium 10, and then perform subsequent processing in response to the reflected light beam.

The details of the apparatus 20 of this invention configured to decide the SAC value suitable for the selected recording layer 101 will be described.

Figure 2:
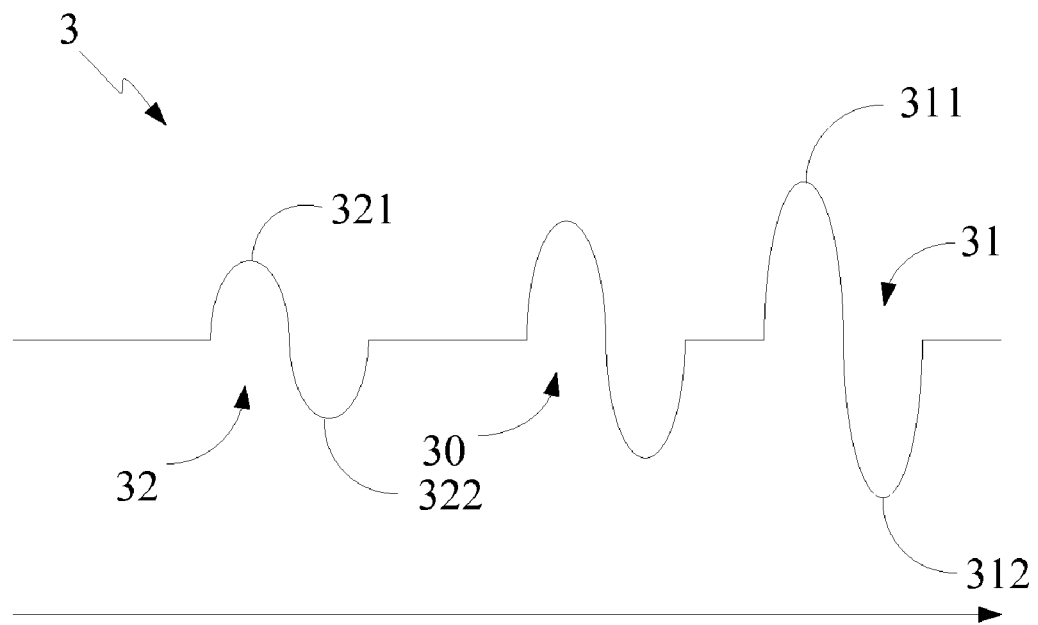
FIG. 2 is a schematic view of an FE signal of this invention.

Initially, the SAC value generator 23 selects a testing SAC value, and controls the SA compensator 262 via the SAC value controller 25 to calibrate the spherical aberration in advance. Then, by using the focusing driver 24 to drive the focusing device 263 of the optical system 26, the FE signal generator 21 performs a focus search on the optical storage medium 10 in response to the testing SAC value. The photo sensor 264 senses an optical signal reflected from the optical storage medium 10 and transmits it to the focus signal generator 21. The focus signal generator 21 generates an FE signal in response to the optical signal. FIG. 2 is a schematic view of an FE signal 3, where the horizontal axis represents a distance between an objective lens and the disc. The FE signal comprises a plurality of s-curves 30, 31, 32, and each of them corresponds to one of the recording layers 100, 101 and the cover layer 102. To be more specific, the s-curve 30 corresponds to the recording layer 100, the s-curve 31 corresponds to the recording layer 101, and the s-curve 32 corresponds to the cover layer 102.

Upon receiving the FE signal 3 from the FE signal generator 21, the focus level generator 22 calculates a center basis according to the FE signal 3 and calculates a center level according to the s-curve 31 corresponding to the selected recording layer 101.

In particular, the s-curve 31 corresponding to the selected recording layer 101 has a peak value 311 and a trough value 312. The focus level generator 22 calculates an average of the peak value 311 and the trough value 312 as the center level. On the other hand, there are two methods for the focus level generator 22 to generate the center basis. The first method is now described. Since the s-curve 32 corresponding to the cover layer 102 has a peak value 321 and a trough value 322 as well, the focus level generator 22 may calculate an average of the peak value 321 and the trough value 322 as the center basis. As to the second method, the focus level generator 22 calculates a DC level signal of the FE signal 3, i.e., an average level of the FE signal 3 prior to the generation of the s-curves 30, 31, 32 as the center basis.

The SAC value generator 23 determines whether the center level and the center basis are equal. If so, the SAC value generator 23 determines that the testing SAC value is the SAC value suitable for the selected recording layer 101.

It should be emphasized that the apparatus 20 of this invention may be further used in combination with other optical access apparatuses, and is not merely limited for use with the optical access apparatus 2 of the first embodiment.

With the above configuration of the first embodiment, an SAC value suitable for the selected recording layer of the optical storage medium can be decided rapidly by using the FE signal 3 corresponding to the testing SAC value.

Like the apparatus 20 shown in FIG. 1, an apparatus 20 of the second embodiment of this invention also comprises an FE signal generator 21, a focus level generator 22, and an SAC value generator 23. The apparatus 20 of the second embodiment may also interact with other elements of the optical access apparatus 2 in the first embodiment to access the optical storage medium 10. The following description will focus on the operations of the apparatus 20 of the second embodiment, while other portions identical to those of the first embodiment will not be described again.

In the second embodiment, the SAC value generator 23 initially selects at least one testing SAC value, and controls the SA compensator 262 via the SAC value controller 25 to calibrate the spherical aberration in advance. Then, the FE signal generator 21 performs a focus search on the optical storage medium 10 to derive a corresponding FE signal 3, as shown in FIG. 2. The FE signal 3 comprises a plurality of s-curves 30, 31, 32, and each of them corresponds to one of the recording layers 100, 101 and the cover layer 102.

The focus level generator 22 calculates a center basis corresponding to the testing SAC value according to the FE signal 3, and calculates a center level corresponding to the testing SAC value according to the s-curve corresponding to the selected recording layer 101. The method for determining the center level is just the same as that of the first embodiment, and thus will not be described again.

Next, the SAC value generator 23 uses the center level and the center basis to decide the SAC value. In particular, if a difference between the center level and the center basis is smaller than or equal to a predetermined value, the SAC value generator 23 determines that the testing SAC value is the SAC value suitable for the selected recording layer.

Figure 3:
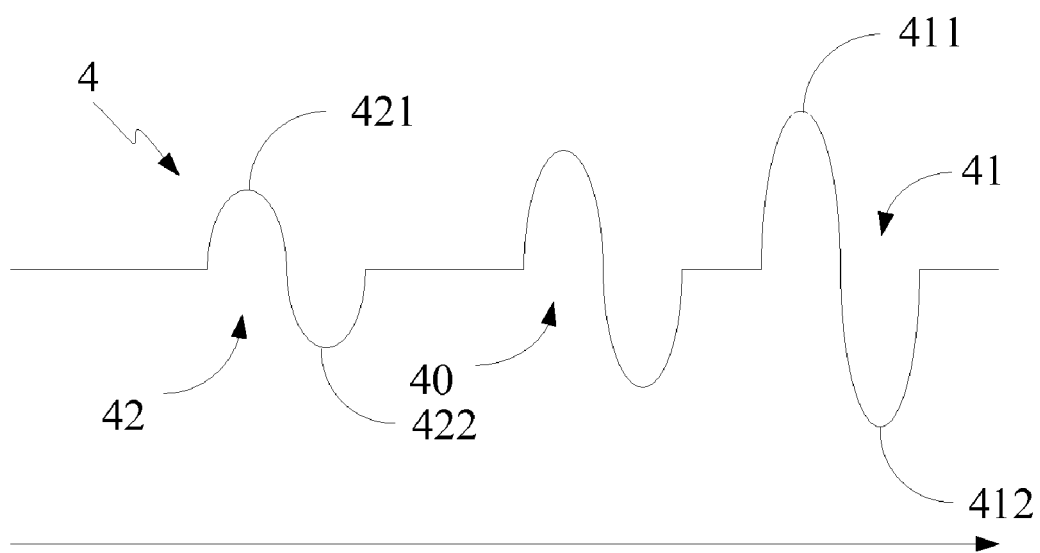
FIG. 3 is a schematic view of another FE signal of this invention.

However, if the difference between the center level and the center basis is greater than the predetermined value, the SAC value generator 23 selects another testing SAC value by a predetermined manner, so that the FE signal generator 21 can derive another FE signal 4 by the same processes described above. FIG. 3 illustrates another FE signal 4, wherein the horizontal axis represents the distance between an objective lens and the disc. The FE signal 4 comprises a plurality of s-curves 40, 41, 42, and each of them corresponds to one of the recording layers 100, 101 and the cover layer 102.

The focus level generator 22 calculates another center basis according to the FE signal 4, and calculates another center level according to the s-curve 41 corresponding to the selected recording layer 101. The methods used to calculate another center basis and center level are just the same as those described above, and thus will not be described again. The SAC value generator 23 then uses the another center level and the another center basis to decide the SAC value.

Next, the SAC value generator 23 determines whether a difference between the another center level and the another center basis is smaller than or equal to the predetermined value. If so, the SAC value generator 23 determines that the another testing SAC value is the SAC value suitable for the selected recording layer. If the difference is greater than the predetermined value, the apparatus 20 repeats the previously described operations. In other words, the apparatus 20 continuously selects a testing SAC value, calculates a corresponding center basis and a corresponding center level according to a corresponding FE signal, and then compares the center basis and the center level. If the difference between the center basis and the center level is smaller than or equal to the predetermined value, then the testing SAC value is set as the SAC value suitable for the selected recording layer 101. Otherwise, the previously described operations are repeated again.

In this embodiment, the aforementioned predetermined manner to select the next testing SAC value is based on a tendency of the result of previous testing SAC values. That is, the tendency reflects whether a difference between the center basis and the center level is becoming larger or smaller. The information indicated in the tendency is used to increase or to decrease the current testing SAC value to be the next testing SAC value. This may effectively reduce the testing times. However, in other embodiments, a next testing SAC value may be randomly decided. After all the testing SAC values have been tested then the optimal SAC value is decided.

With the above configuration, the second embodiment repeatedly calculates the corresponding center level and the corresponding center basis according to the FE signal corresponding to the testing SAC value to decide the SAC value for the selected recording layer of the optical storage medium.

An apparatus 20 of a third embodiment of this invention is also similar to the apparatus 20 shown in FIG. 1, and may also interact with other elements of the optical access apparatus 2 in the first embodiment to access the optical storage medium 10. The optical storage medium 10 is the same in structure as that of the first embodiment and thus will not be described again as well. The following description will focus on the differences between the apparatus 20 of the third embodiment and the above embodiments. In the third embodiment, a curve fitting method is used to derive a suitable SAC value. The third embodiment has two operating mode distinguished by the calculation methods of the center basis.

The first operating mode will be described first. In response to at least one testing SAC value of the selected recording layer 101, the FE signal generator 21 performs a focus search on the optical storage medium 10 to derive at least one FE signal 3. The FE signal 3 comprises a plurality of s-curves 30, 31, 32, and each of them corresponds to one of the recording layers 100, 101 and the cover layer 102. The focus level generator 22 then calculates a center basis according to the FE signal 3 and calculates a center level according to the s-curve 31 corresponding to the selected recording layer 101.

Next, in response to another testing SAC value of the selected recording layer 101, the FE signal generator 21 performs another focus search on the optical storage medium 10 to derive another FE signal 4. The FE signal 4 comprises a plurality of s-curves 40, 41, 42, and each of them corresponds to one of the recording layers 100, 101 and the cover layer 102. The focus level generator 22 then calculates another center basis according to the FE signal 4 and calculates another center level according to the s-curve 41 corresponding to the selected recording layer 101. In this way, the focus level generator 22 obtains a plurality of center levels and a plurality of center bases corresponding to a plurality of testing SAC values respectively.

In particular, in the first operating mode, the center basis is an average of a peak value 321 and a trough value 322 of the s-curve 32 corresponding to the cover layer 102, while the center basis is an average of a peak value 421 and a trough value 422 of the s-curve 42 corresponding to the cover layer 102.

Figure 4:
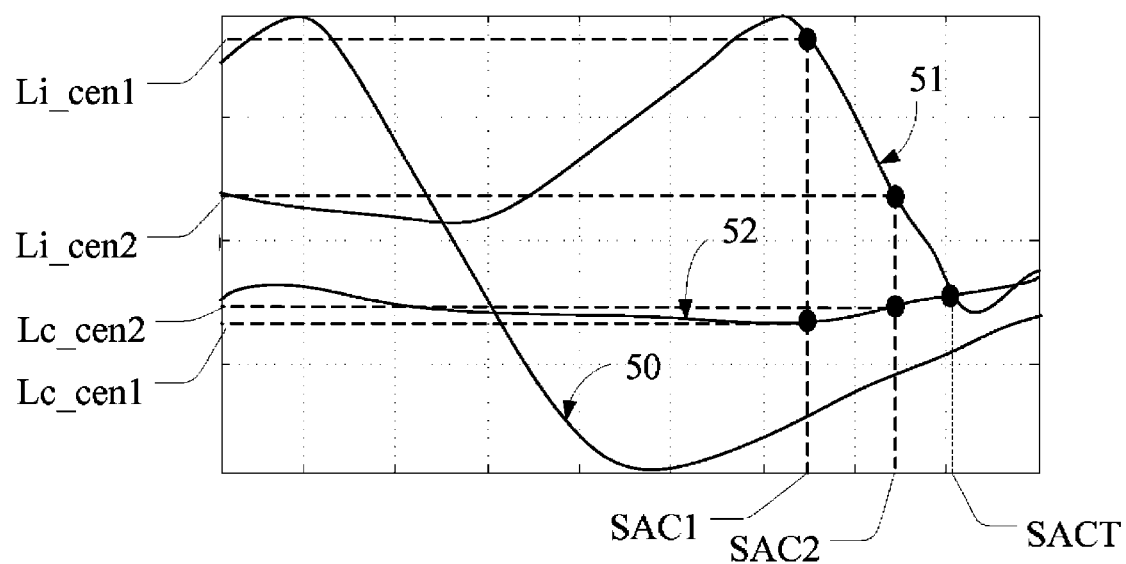
FIG. 4 is a schematic diagram of the testing SAC value versus a center basis and a center level.

As shown in FIG. 4, a schematic view of the testing SAC value versus the center basis and center level is depicted therein. Here, the horizontal axis represents the testing SAC value, the vertical axis represents numeric values of the center basis and the center level, and curves 50, 51, 52 correspond to the recording layer 100, the selected recording layer 101, and the cover layer 102 respectively. As shown in FIG. 4, when the testing SAC value SAC1 is selected, the focus level generator 22 will derive a center basis Lc_cen1 and a center level Li_cen1. When another testing SAC value SAC2 is selected, the focus level generator 22 will derive another center basis Lc_cen2 and another center level Li_cen2.

The SAC value generator 23 then decides an SAC value suitable for the selected recording layer 101 by a curve fitting method according to the center basis Lc_cen1, the another center basis Lc_cen2, the center level Li_cen1 and the another center level Li_cen2. The curve fitting method may be an interpolation method, an extrapolation method, or other curve fitting methods. For example, the curve fitting method can be expressed as:

$$SACT = SAC1 + \frac{(Lc\_cen - Li\_cen1)}{(Li\_cen2 - Li\_cen1)} \times (SAC2 - SAC1),$$

wherein Lc_cen is an average of the center basis Lc_cen1 and the another center basis Lc_cen2, while SACT represents an SAC value suitable for the selected recording layer 101.

The second operating mode will be described next. In the second operating mode, the center level and the center basis are also calculated. However, the center basis is a DC level signal Fe_cen of the FE signal 3, i.e., an average level of the FE signal prior to the generation of the s-curves. Subsequently, the second operating mode simply calculates another center level but not another center basis.

Accordingly, by substituting the DC level signal Fe_cen of the FE signal 3 for the item Lc_cen into the above equation, the SAC value SACT may be calculated according to the following equation in the second operating mode:

$$SACT = SAC1 + \frac{(Fe\_cen - Li\_cen1)}{(Li\_cen2 - Li\_cen1)} \times (SAC2 - SAC1).$$

With the above arrangement of the third embodiment, an FE signal can be derived for each of the two testing SAC values, and then the corresponding center levels and corresponding center bases are calculated. On this basis, an SAC value suitable for the selected recording layer of the optical storage medium can be decided by a curve fitting method. Therefore, the process provided in the third embodiment is more rapid than that provided in the second embodiment.

Figure 5:
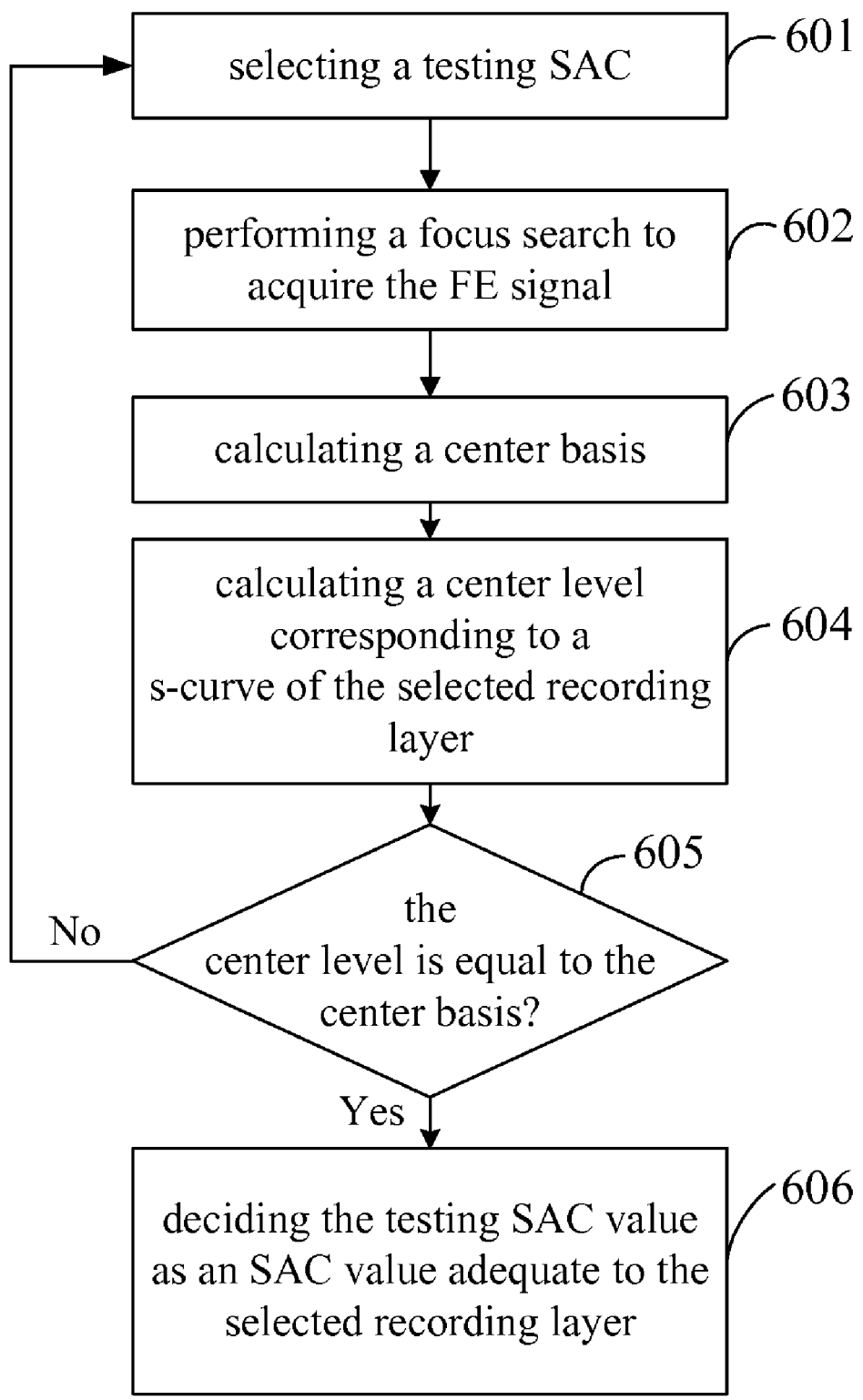
FIG. 5 is a flow diagram of a fourth embodiment of this invention.

FIG. 5 depicts a fourth embodiment of this invention, which is a method for deciding an SAC value for an optical storage medium. The optical storage medium comprises at least one recoding layer and a cover layer. The SAC value is suitable for the selected one of the at least one recording layer. This method is applicable to the aforementioned apparatus 20 as well as the optical access apparatus 2 and other optical access apparatuses.

More specifically, once it is decided to start the calibration of the spherical aberration, the following steps will be executed. Initially, step 601 is executed to select a testing SAC value of a selected recording layer 101. Then, step 602 is executed to perform a focus search on the optical storage medium 10 to derive an FE signal in response to the testing SAC value. The FE signal comprises a plurality of s-curves, and each of them corresponds to one of the at least one recording layer and the cover layer, respectively.

Next, in step 603, a center basis corresponding to the testing SAC value is calculated according to the FE signal. In step 603, the center basis may be calculated with different methods. The first method averages a peak value and a trough value of an s-curve corresponding to the cover layer as the center basis. The second approach calculates a DC level signal of the FE signal as the center basis, where the DC level signal is an average level of the FE signal prior to the generation of the s-curves. In step 604, a center level corresponding to the testing SAC value is calculated according to the s-curve corresponding to the selected recording layer. In particular, an average of a peak value and a trough value of the s-curve corresponding to the selected recording layer is calculated as the center level. In other examples, step 604 may also be executed before step 603.

Subsequently, it is determined whether the center level is equal to the center basis in step 605. If so, step 606 is executed to determine that the testing SAC value is the SAC value suitable for the selected recording layer. If the answer of step 605 is no, the process returns back to step 601 to select another testing SAC value, and then the above steps are repeated again.

In addition to the steps depicted in FIG. 5, the fourth embodiment may further execute the operations and functions of the first embodiment. Those of ordinary skill in the art may readily understand how the fourth embodiment executes these operations and functions based on the descriptions of the first embodiment. Thus, this will not be further described herein.

Compared to the conventional solutions, the fourth embodiment can calculate an SAC value suitable for the selected recording layer simply according to the FE signal corresponding to the testing SAC value without the need of complex computations.

Figure 6:
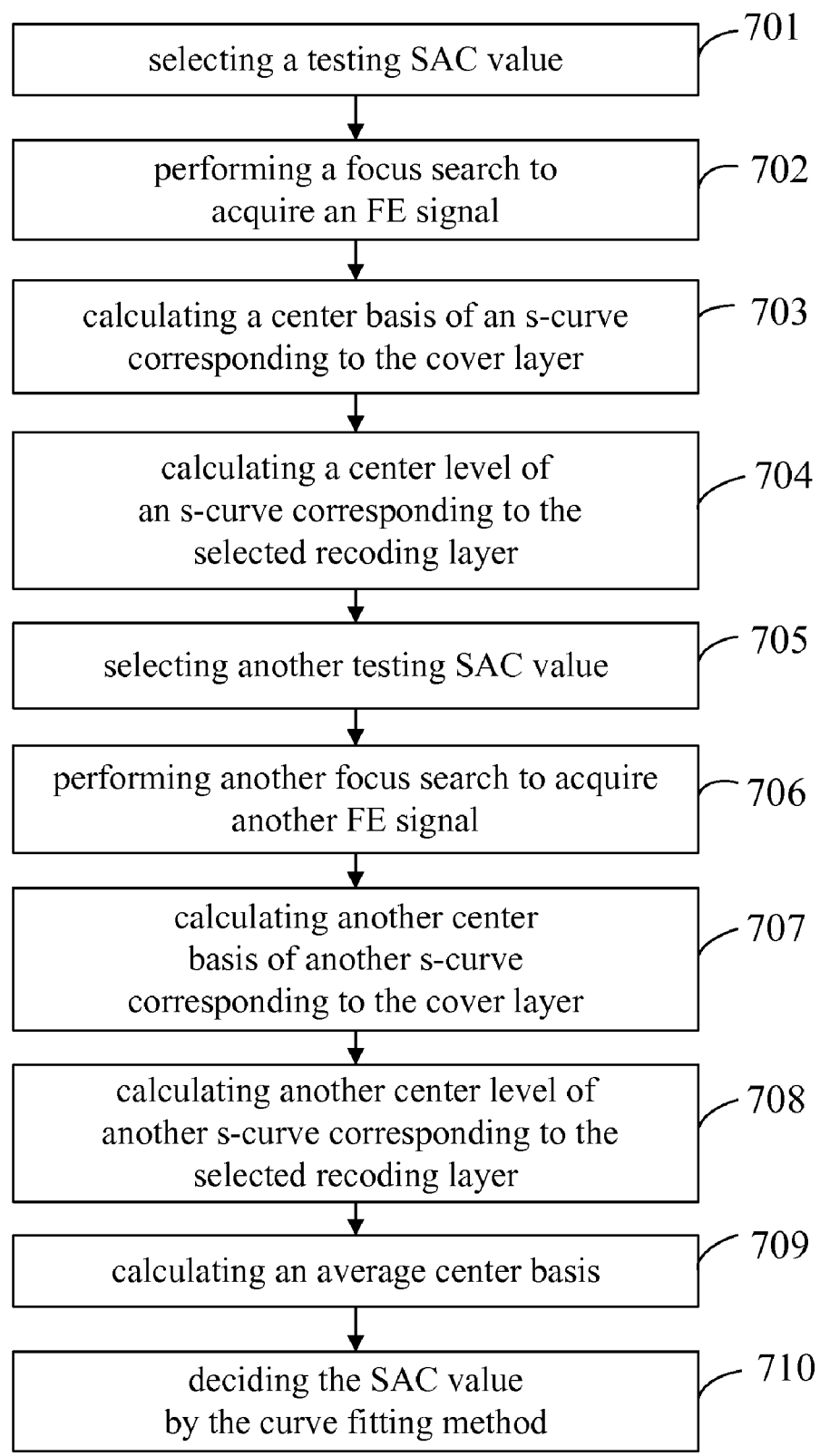
FIG. 6 is a flow diagram of a fifth embodiment of this invention.

FIG. 6 depicts a fifth embodiment of this invention, which is a method for deciding an SAC value for an optical storage medium. The optical storage medium comprises at least one recoding layer and a cover layer. The SAC value is suitable for the selected one of the at least one recording layer. This method is applicable to the aforementioned apparatus 20 as well as the optical access apparatus 2 and other optical access apparatuses.

More specifically, once it is decided to start the process of calibrating the spherical aberration in the fifth embodiment, the following steps will be executed. Initially, step 701 is executed to select a testing SAC value SAC1. Then, step 702 is executed to perform the focus search on the optical storage medium to derive an FE signal 3 in response to the testing SAC value SAC1. The FE signal 3 comprises a plurality of s-curves, each of which corresponds to one of the at least one recording layer and the cover layer respectively.

Next, in step 703, an average of a peak value 321 and a trough value 322 of an s-curve 32 corresponding to the cover layer 102 is calculated as a center basis Lc_cen1 according to the FE signal 3. In step 704, an average of a peak value 311 and a trough value 312 of the s-curve 31 corresponding to the selected recording layer 101 is calculated as a center level Li_cen1 according to the FE signal 3. In other examples, step 704 may be executed before step 703.

Then, step 705 is executed to select another testing SAC value SAC2. In response to the testing SAC value SAC2, step 706 is executed to perform a focus search on the optical storage medium to derive another FE signal 4. Next in step 707, an average of a peak value 421 and a trough value 422 of the s-curve 42 corresponding to the cover layer is calculated as another center basis Lc_cen2 according to the another FE signal 4. In step 708, in response to the FE signal 4, an average of a peak value 411 and a trough value 412 of the s-curve 41 corresponding to the selected recording layer is calculated as another center level Li_cen2 according to the another FE signal 4. Likewise, in other examples, step 708 may be executed before step 707. Subsequently, an average of the first center basis Lc_cen1 and the center basis Lc_cen2 is calculated as an average center basis Lc_cen in step 709. Finally, step 710 is executed to calculate the SAC value SACT suitable for the selected recording layer by a curve fitting method according to the average center basis Lc_cen, the center level Li_cen1, another center level Li_cen2, the testing SAC value SAC1, and another testing SAC value SAC2. For example, the following equation may be used:

$$SACT = SAC1 + \frac{(Lc\_cen - Li\_cen1)}{(Li\_cen2 - Li\_cen1)} \times (SAC2 - SAC1)$$

In addition to the steps depicted in FIG. 6, the fifth embodiment may further execute the operations and functions described in the first operating mode of the third embodiment. Those of ordinary skill in the art may readily understand how the fifth embodiment executes these operations and functions based on the descriptions of the first operating mode of the third embodiment. Thus, this will not be further described herein.

With the above steps of the fifth embodiment, the corresponding FE signals can be derived respectively from two testing SAC values, and then the corresponding center levels and corresponding center bases are decided. On this basis, an SAC value suitable for the selected recording layer of the optical storage medium can be decided by the curve fitting method.

Figure 7:
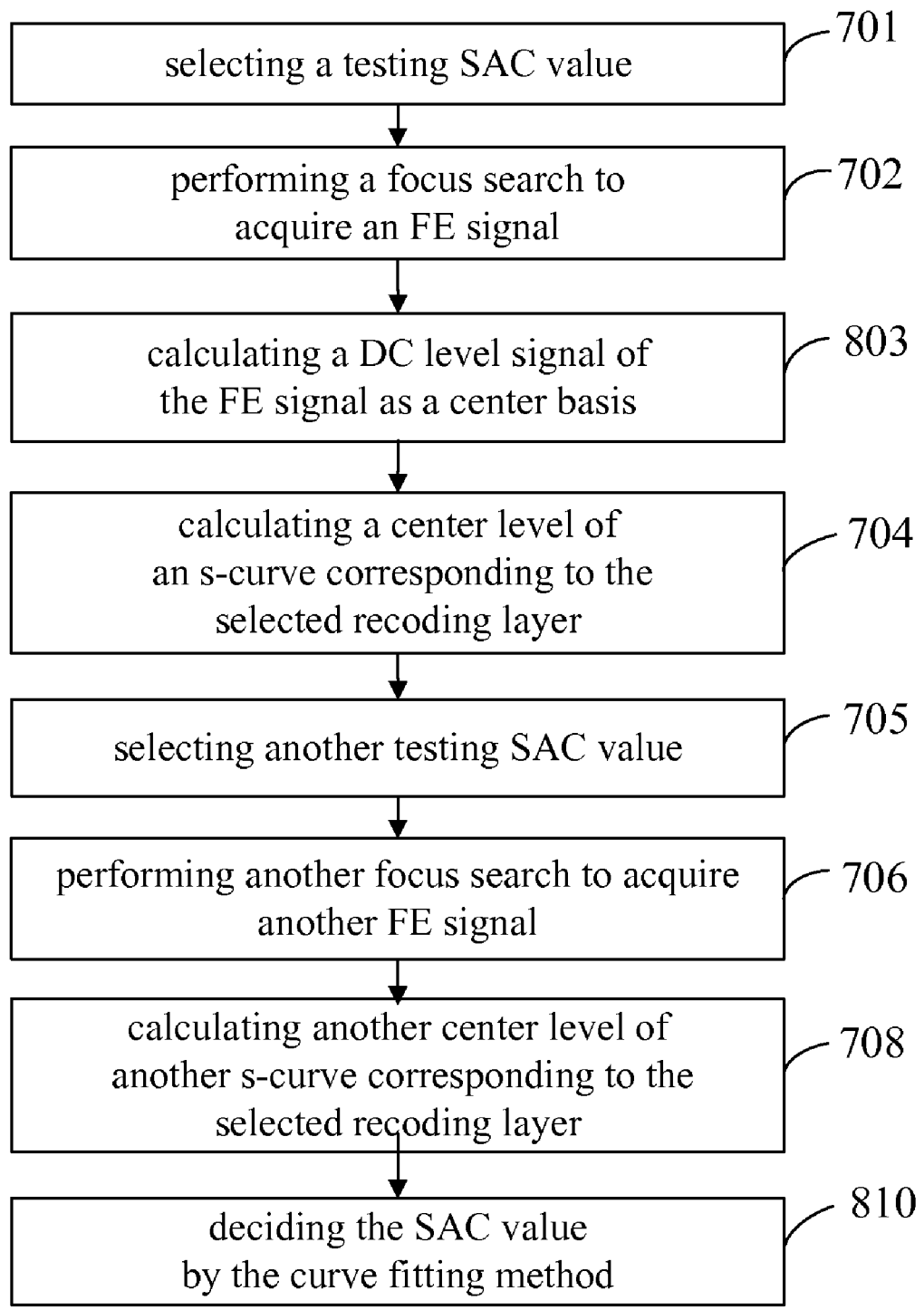
FIG. 7 is a flow diagram of a sixth embodiment of this invention.

FIG. 7 depicts a sixth embodiment of this invention, which is a method for deciding an SAC value for an optical storage medium. The optical storage medium comprises at least one recoding layer and a cover layer. The SAC value is suitable for the selected one of the at least one recording layer. This method is applicable to the aforementioned apparatus 20 as well as the optical access apparatus 2 and other optical access apparatuses.

Because the sixth embodiment is similar to the fifth embodiment, only the differences between them will be detailed hereinafter. In the sixth embodiment, after the steps 701 and 702 (the same as those in the fifth embodiment), step 803 is executed to calculate a DC level signal Fe_cen of the FE signal 3, i.e., an average level of the FE signal 3 prior to the generation of the s-curves. Following step 803, steps 704, 705, 706, 707 (just the same as those of the fifth embodiment) are executed, and then step 810 is executed. In step 810 of this embodiment, an SAC value SACT is calculated according to the following equation:

$$SACT = SAC1 + \frac{(Fe\_cen - Li\_cen1)}{(Li\_cen2 - Li\_cen1)} \times (SAC2 - SAC1)$$

However, unlike the fifth embodiment, the value Fe_cen of the DC level signal of the FE signal 3 is substituted for the average center basis.

With the steps 803, 810, the sixth embodiment provides another method for deciding an SAC value for an optical storage medium, which is similar to the fifth embodiment. Likewise, the two testing SAC values are used in the sixth embodiment to derive respective FE signals, which are then used to derive a desired result. In addition to the steps depicted in FIG. 7, the sixth embodiment may further execute the operations and functions described in the second operating mode of the third embodiment. Those of ordinary skill in the art may readily understand how the sixth embodiment executes these operations and functions based on the descriptions of the second operating mode of the third embodiment. Thus, this will not be further described herein.

Figure 8:
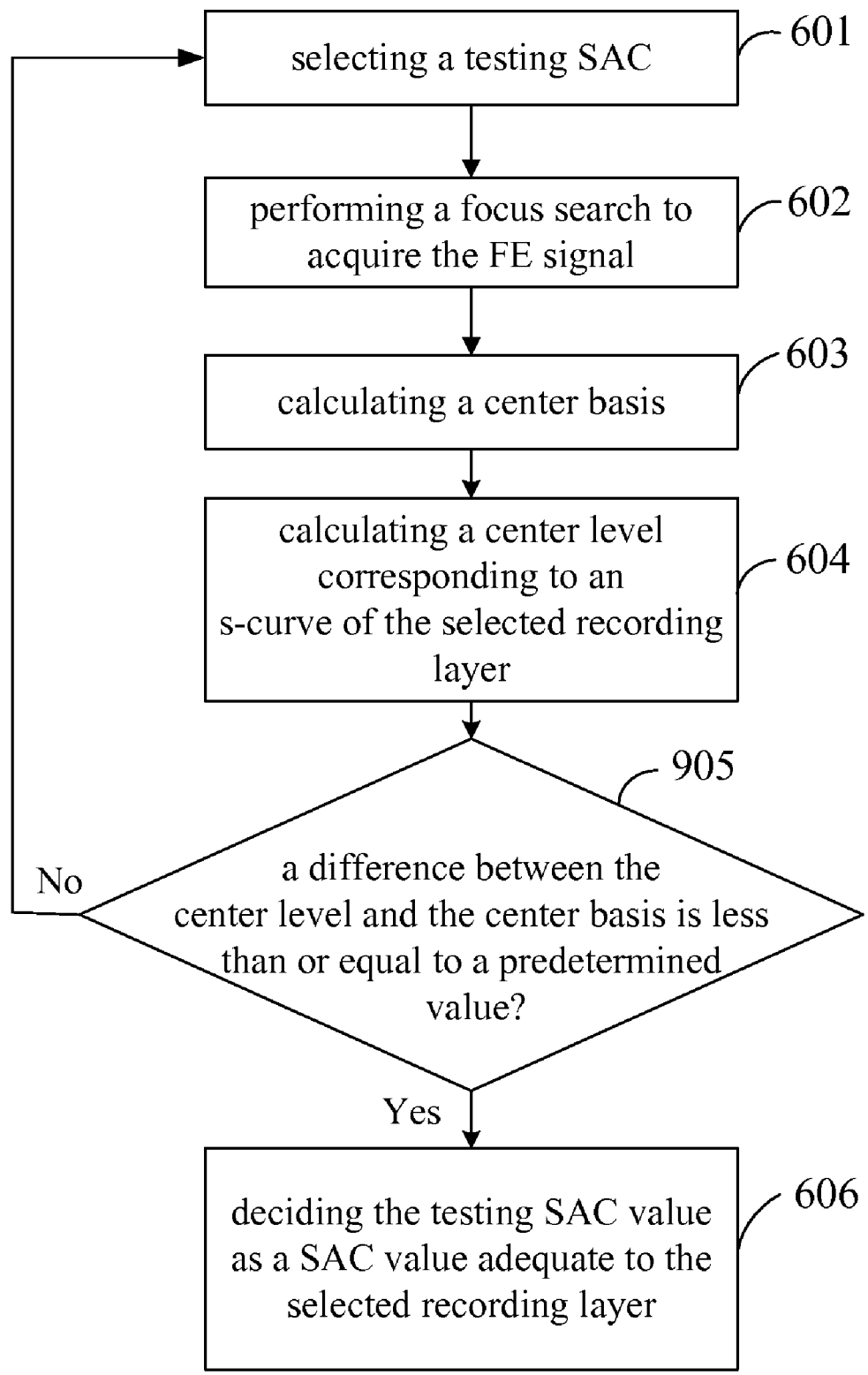
FIG. 8 is a flow diagram of a seventh embodiment of this invention.

FIG. 8 depicts a seventh embodiment of this invention, which is a method for deciding an SAC value for an optical storage medium. The optical storage medium comprises at least one recoding layer and a cover layer. The SAC value is suitable for a selected one of the at least one recording layer. This method is applicable to the aforementioned apparatus 20 as well as the optical access apparatus 2 and other optical access apparatuses.

Because the seventh embodiment is similar to the fourth embodiment, only differences between them will be detailed hereinafter. In the seventh embodiment, after the steps 601, 602, 603 and 604 (the same as those of the fourth embodiment) have been executed, step 905 is executed to determine whether a difference between a center level Lc_cen and a center basis is smaller or equal to a predetermined value. If so, step 606 (the same as that of the fourth embodiment) is executed. Otherwise, the process returns to step 601 to select another testing SAC value and repeats the above calculation.

In addition to the steps depicted in FIG. 8, the seventh embodiment may further execute the operations and functions of the second embodiment. Those of ordinary skill in the art may readily understand how the seventh embodiment executes these operations and functions based on the descriptions of the second embodiment. Thus, this will not be further described herein.

With the above apparatus and methods for deciding an SAC value for an optical storage medium, this invention can derive a suitable SAC value simply according to FE signals corresponding to the testing SAC values. Therefore, the present invention remarkably simplifies the conventional methods.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for deciding a spherical aberration compensation (SAC) value for an optical storage medium comprising at least one recoding layer and a cover layer, the SAC value being suitable for a selected recording layer among the at least one recording layer, the method comprising the steps of:

(a) performing at least one focus search on the optical storage medium to derive at least one focus error (FE) signal in response to at least one testing SAC value, the FE signal comprising a plurality of s-curves, each of the s-curves corresponding to one of the at least one recording layer and the cover layer respectively;

(b) calculating a center basis corresponding to the testing SAC value according to the FE signal;

(c) calculating a center level corresponding to the testing SAC value according to the s-curve corresponding to the selected recording layer; and (d) deciding the SAC value according to the center level, the center basis, and the testing SAC value.

2. The method as claimed in claim 1, wherein the step (d) comprises the steps of:

determining that a difference between the center level and the center basis is smaller than or equal to a predetermined value; and deciding that the SAC value is the testing SAC value according to the result of the determination.

3. The method as claimed in claim 1, wherein the step (d) comprises the steps of:

(d1) determining that the center level and the center basis corresponding to the testing SAC value are not equal, and (d2) deciding the SAC value by another center level and another center basis corresponding to another testing SAC value.

4. The method as claimed in claim 1, further comprising the steps of:

acquiring a plurality of center levels and a plurality of center bases, each of the center levels respectively corresponding to one of the at least one testing SAC values, and each of the center bases respectively corresponding to one of the at least one testing SAC values;

wherein the step (d) further decides the SAC value by a curve fitting method according to the at least one testing SAC values, the center levels, and the center bases.

5. The method as claimed in claim 1, wherein the s-curve corresponding to the selected recording layer has a peak value and a trough value, and the step (c) calculates an average of the peak value and the trough value as the center level.

6. The method as claimed in claim 1, wherein the s-curve corresponding to the cover layer has a peak value and a trough value, and the step (b) calculates an average of the peak value and the trough value as the center basis.

7. The method as claimed in claim 1, wherein the step (b) calculates a DC level signal of the FE signal as the center basis, and the DC level signal is an average level of the FE signal prior to the generation of the s-curves.

8. An apparatus for deciding a spherical aberration compensation (SAC) value for an optical storage medium comprising at least one recoding layer and a cover layer, the SAC value being suitable for a selected recording layer among the at least one recording layer, the apparatus comprising:

a focus error (FE) signal generator, being configured to perform at least one focus search on the optical storage medium to derive at least one FE signal in response to at least one testing SAC value, the FE signal comprising a plurality of s-curves, each of the s-curves corresponding to one of the at least one recording layer and the cover layer respectively;

a focus level generator, being configured to calculate a center basis corresponding to the testing SAC value according to the FE signal, and calculate a center level corresponding to the testing SAC value according to the s-curve corresponding to the selected recording layer; and an SAC value generator, being configured to decide the SAC value according to the center level, the center basis, and the testing SAC value.

9. The apparatus as claimed in claim 8, wherein the SAC value generator determines that a difference between the center level and the center basis is smaller than or equal to a predetermined value, and decides that the SAC value is the testing SAC value according to the result of the determination.

10. The apparatus as claimed in claim 8, wherein the SAC value generator determines that the center level and the center basis corresponding to the testing SAC value are not equal, and decides the SAC value by another center level and another center basis corresponding to another testing SAC value.

11. The apparatus as claimed in claim 8, wherein the focus level generator further acquires a plurality of center levels and a plurality of center bases, each of the center levels respectively corresponds to one of the at least one testing SAC values, each of the center bases respectively corresponds to one of the at least one testing SAC values, and the SAC value generator further decides the SAC value by the at least one testing SAC values, the center levels, and the center bases by a curve fitting method.

12. The apparatus as claimed in claim 8, wherein the s-curve corresponding to the selected recording layer has a peak value and a trough value, and the focus level generator calculates an average of the peak value and the trough value as the center level.

13. The apparatus as claimed in claim 8, wherein the s-curve corresponding to the cover layer has a peak value and a trough value, and the focus level generator calculates an average of the peak value and the trough value as the center basis.

14. The apparatus as claimed in claim 8, wherein the focus level generator calculates a DC level signal of the FE signal as the center basis, and the DC level signal is an average level of the FE signal prior to the generation of the s-curves.

* * * * *